Nov. 4, 1947.   H. E. KENNEDY   2,430,055
BLANKETED ELECTRIC ARC METHOD OF MAKING INTERMITTENT WELDS
Filed Jan. 27, 1944
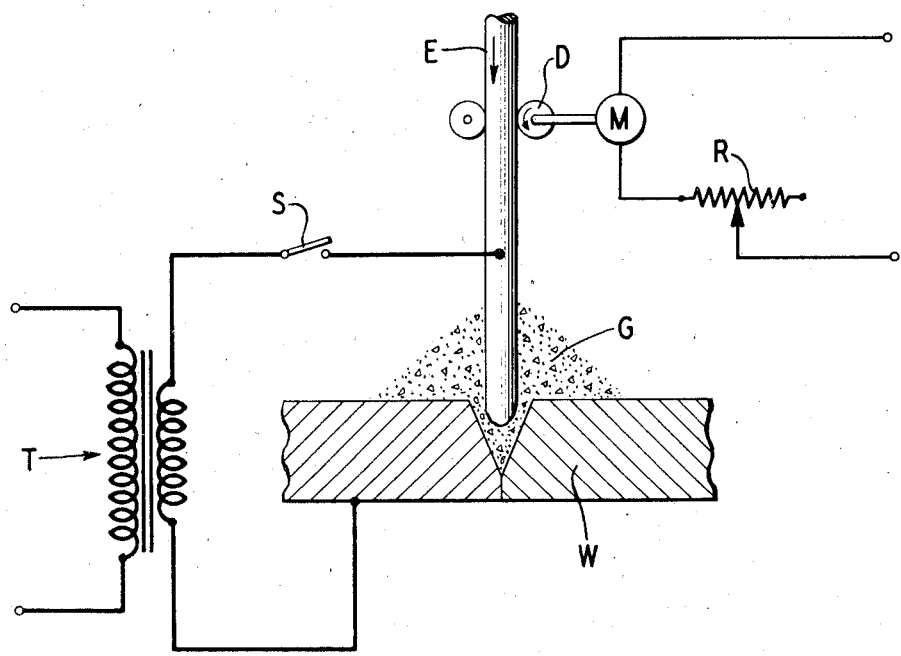
INVENTOR
HARRY E. KENNEDY
BY
ATTORNEY Patented Nov. 4, 1947

2,430,055

UNITED STATES PATENT OFFICE 2,430,055

BLANKETED ELECTRIC ARC METHOD OF MAKING INTERMITTENT WELDS

Harry E. Kennedy, Berkeley, Calif., assignor to The Linde Air Products Company, a corporation of Ohio Application January 27, 1944, Serial No. 519,833

1 Claim. (Cl. 219—10)

This invention relates to improvements in the art of electric welding. More specifically, the invention concerns alternating electric current welding processes in which the operating end of a fusible metal electrode is buried in a mass of finely divided mineral-like material which in turn blankets a welding zone on a metal workpiece.

For many years alternating current electric arc welding operators have used, exclusively, sources of welding current controlled by inductive reactance. The usual form of the current source is a high-reactance or constant-current transformer circuit, with the reactance either built into the transformer or externally connected. Such a welding system provides improved control and a more stable arc.

The disadvantages of the reactance controlled system are its low power factor and the fact that the transformer must be relatively large and expensive. As a larger transformer is required to deliver a given amount of energy at high reactance than to deliver the same amount at low reactance, it is apparent that to cover a wide range of reactances at a given energy output will require a larger transformer than would be required for a low reactance, constant-potential system. It has been found well worth while to accept these disadvantages to obtain the improved arc characteristics, and for many years constant-potential systems have not been used.

I have now discovered certain welding conditions under which, contrary to all prior experience of the art, a constant-potential alternating current source is actually more advantageous than a constant-current source. Specifically, in welding operations involving no translatory relative motion between the workpiece and electrode, and involving the use of a deep blanket of comminuted mineral-like material which covers the welding zone, a constant-potential welding transformer is by far the more satisfactory. Typical examples of such welding operations are the making of plug, stud, and tack welds by the welding process described, for instance, in Patent 2,043,960, L. T. Jones, H. E. Kennedy, and M. A. Rotermund.

I have further found that for such intermittent operations as are involved in making tack, plug, and stud welds, it is feasible and indeed preferable from the standpoints of economy and of improved operation to use a relatively small constant-potential transformer operated at two to four times its rated energy output for continuous operation. For example, where a high-reactance, constant-current transformer of 75 to 100 k. v. a. rated capacity would normally be used, it is desirable to use an overloaded constant-potential, low-reactance transformer of 5 to 10 k. v. a. rated capacity. The short periods of overload required for making tack, plug, and stud welds are of but a few seconds duration and do not injure the transformer.

The figure of the drawing illustrates an alternating electric current welding system for practising my method.

The invention is an alternating current electric welding method adapted to be practiced with a system comprising a welding zone, including a metal workpiece prepared for an intermittent weld (plug, tack, stud, or the like) and an end of a fusible metal electrode arranged in operative juxtaposition to the workpiece; a quantity of comminuted mineral welding material blanketing such welding zone; and a constant-potential alternating current electrical transformer having a secondary connected across the electrode and the workpiece. Preferably, a switch is connected in series with the secondary of the transformer.

The invention is also, in another aspect, a method of making intermittent welds (plug, tack, stud and the like) by alternating electric current supplied by the above-described welding system of the invention. In this method, the system is preferably operated at a welding energy consumption two to four times that at which the transformer is rated for continuous output.

An immediately apparent advantage of this invention is the great gain in portability and cheapness of the equipment. Further, the system operates at a materially better power factor.

The less obvious advantages are probably even more important. For instance, to commence a weld it is necessary only to advance the end of the electrode into the welding composition until its end touches the workpiece, whereupon a very large current will flow, quickly melting the end of the electrode and establishing a welding gap instead of merely sticking the end of the rod to the work as would occur in an ordinary high-reactance circuit. As soon as the welding gap is established, the current falls to an appropriate level. As the length of the welding gap increases with the melting and depositing of electrode metal, the current decreases, and when the gap has become of such length that the applied voltage is insufficient to maintain a flow of current across it, welding ceases.

By suitably selecting the size of electrode and capacity of transformer it is a simple matter to deposit exactly the desired weight of metal without advancing the electrode to shorten the gap during welding. Alternatively, the electrode may be advanced towards the workpiece either intermittently or continuously to maintain the welding current for the desired length of time. The first-mentioned procedure is particularly well suited to the making of a large number of identical weld deposits, for after the electrode size has been selected each weld may be quickly made with no more attention than is required to inject the electrode into the welding composition at the desired point. Where the size of the weld must be varied more frequently, the latter alternative offers advantages.

It was not apparent a priori that the presence of a blanket of welding material would act to stabilize the current conditions at the welding gap in a manner permitting the use of a high power factor constant-potential current source. Indeed, it might have been supposed that the presence of a molten mineral-like material would all the more readily extinguish the current flow at the moments when both voltage and current are approximately zero.

The attached drawing illustrates an alternating electric current welding system, according to the invention, comprising a metal workpiece W prepared for an intermittent weld; an end of a fusible metal electrode E arranged in operative juxtaposition to the workpiece; a blanket G of comminuted mineral welding material; and a low-reactance transformer T having a secondary connected, through a switch S, across the electrode and workpiece. If it is desired to advance the electrode towards the workpiece, this result may be accomplished by conventional means such as driving rolls D driven by a motor M of which the speed of rotation may be controlled by a rheostat R.

I claim:

A method of making an intermittent weld which comprises forming on a metal workpiece at the point to be welded a blanket of comminuted mineral welding material; electrically contacting an end of a fusible metal electrode with said workpiece through said blanket; and supplying across such electrode and workpiece an alternating electric current at a substantially constant voltage to fuse said end of said electrode and to form a gap which is increased in length until the said voltage will no longer bridge the gap.

HARRY E. KENNEDY.

REFERENCES CITED

The following references are of record in the file of this patent:

UNITED STATES PATENTS

| Number | Name | Date |
|---|---|---|
| 2,043,960 | Jones et al. | June 9, 1936 |
| 2,326,865 | Kennedy | Aug. 17, 1943 |
| 1,979,944 | Kost | Nov. 6, 1934 |
| 2,351,083 | Tyrner | June 13, 1944 |
| 2,310,886 | Wentz | Feb. 9, 1943 |
| 2,305,206 | Strobel | Dec. 15, 1942 |